United States Patent [19]
Simon

[11] Patent Number: 5,340,477
[45] Date of Patent: Aug. 23, 1994

[54] PRODUCED WATER-OIL SEPARATION TANK FOR EMULSIONS

[75] Inventor: Robert L. Simon, Marrero, La.

[73] Assignee: Texaco Inc., White Plains, N.Y.

[21] Appl. No.: 984,761

[22] Filed: Dec. 3, 1992

[51] Int. Cl.5 .................................... B01D 17/025
[52] U.S. Cl. ..................... 210/218; 210/248; 210/539; 210/540
[58] Field of Search ............ 210/109, 137, 248, 513, 210/540, 708, 188, 218, 539, 800; 208/187

[56] References Cited

U.S. PATENT DOCUMENTS

| | | | |
|---|---|---|---|
| 4,428,841 | 1/1984 | Favret | 210/540 |
| 5,147,534 | 9/1992 | Rymal | 210/137 |
| 5,154,835 | 10/1992 | Demichael | 210/540 |
| 5,248,439 | 9/1993 | Derrell | 210/532.1 |
| 5,286,383 | 2/1994 | Verret et al. | 210/540 |

FOREIGN PATENT DOCUMENTS 2193955  2/1988  United Kingdom ................ 210/513

Primary Examiner—Joseph W. Drodge
Attorney, Agent, or Firm—Kenneth R. Priem; Robert B. Burns; Russell J. Egan

[57] ABSTRACT

A separator apparatus for breaking emulsions, particularly an emulsion formed of the hydrocarbon liquid and an aqueous solution, wherein the emulsion is introduced to a main separating tank. The latter includes at least one inlet for introducing emulsion, and a separate discharge port for conducting hydrocarbon-free aqueous component from the tank. An overflow trough positioned near the tank proportion includes a stripping weir which passes the flow of the hydrocarbon which has floated to the surface of the heavier water component. Emulsion flow to the tank is controlled by a flow regulator comprised primarily of a water level sensing means.

4 Claims, 1 Drawing Sheet

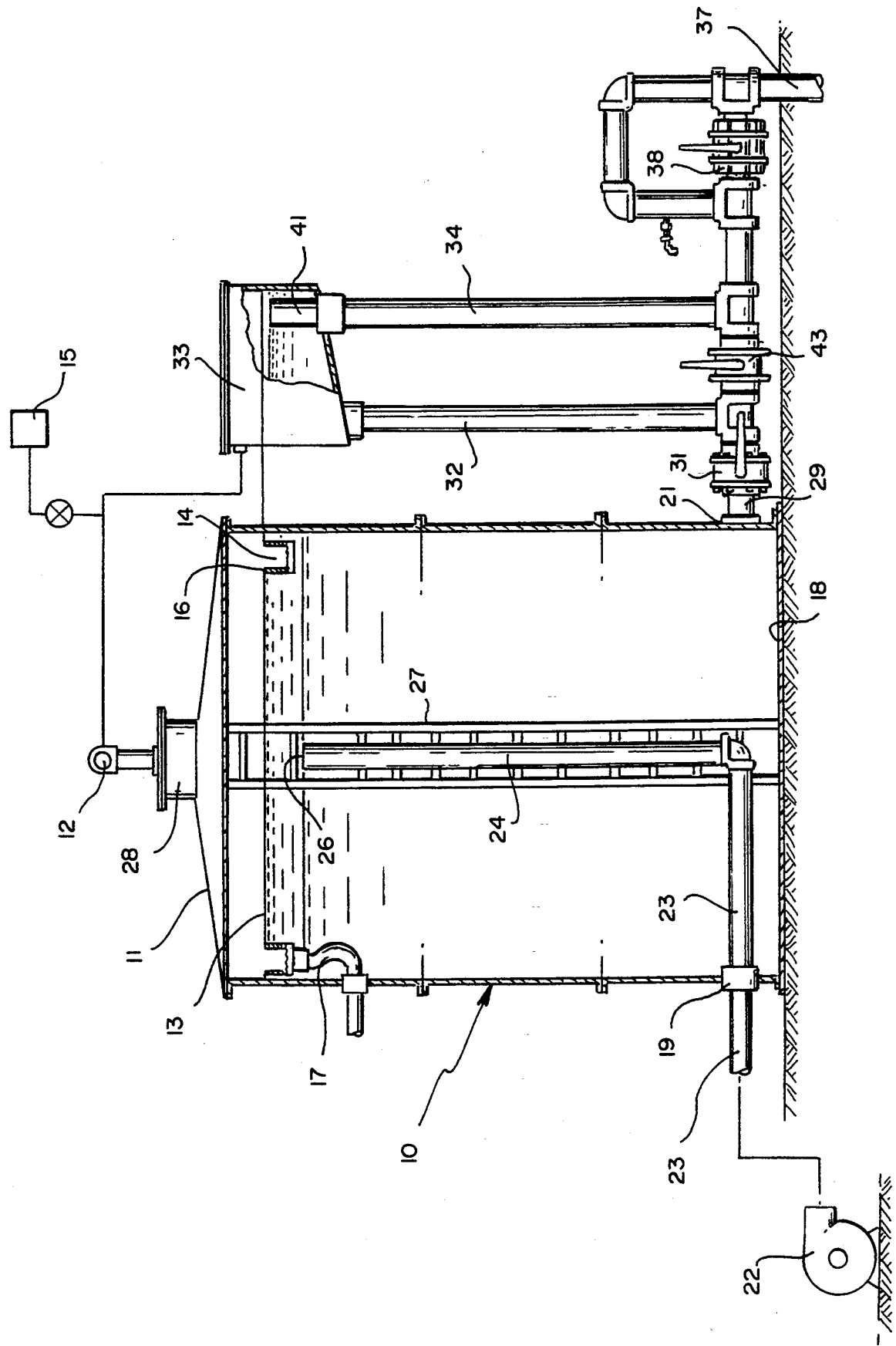

PRODUCED WATER-OIL SEPARATION TANK FOR EMULSIONS

BACKGROUND OF THE INVENTION

In any process where liquids of different densities form an emulsion as a part of the process, it is often desirable and economical to break the emulsion for possible reuse of one or more of the liquid components. The emulsion breaking process is exemplified by its wide use in the petroleum industry. Here, as a result of either the producing or refining steps of a crude product, it is not only desirable, but sometimes necessary to separate or break an emulsion compromised primarily of water and crude oil. Due to the different densities, oil ordinarily floats to the surface of the water segment.

For large scale operations, the separation procedure usually embodies a gravity separation in which the heavier water or aqueous solution will gravitate to the bottom of a holding tank or receptacle. As the lighter hydrocarbon component rises to the water's surface it can be skimmed off or otherwise removed.

Toward assuring an efficient and continuous emulsion breaking operation, the separating tank is usually provided with means for adjusting the flow rate of the crude or separated oil, to assure a degree of continuity in flow through.

The separation or emulsion breaking process finds particular relevance in the offshore petroleum industry where it is essential to separate the crude product from produced water. An environmental mandate followed by the industry is to dispose of produced water back into the surrounding body of water without causing pollution to the latter. Alternately, the produced water can be disposed of by underground injection. In either instance the produced water must be free of all traces of crude oil if federal and state regulations are to be complied with.

Toward achieving an efficient emulsion separation process and to illustrate the invention, there is hereinafter disclosed a water-oil separation facility for treating or breaking an emulsion comprised primarily of water or an aqueous solution, together with a crude oil segment. The emulsion tank receives a continuous flow of the emulsion, preferably at an inlet adjacent to the tank's floor. Physical separation of the crude oil from the water will be essentially a gravity flow. Thus, the lighter oil component will slowly gravitate toward the surface of the relatively quiescent body of water. Chemicals can be added to the emulsion to accelerate the separation process.

The top of the emulsion-holding tank interior wall is provided with an overflow trough which embodies a skimming weir. This trough encircles the tank at an elevation such that the thin floating layer of oil will overflow into the skimming weir. Thereafter the oil is discharged from the trough to a collection point or to a storage tank.

Separated water is conducted from the tank into a flow control system comprised primarily of a pair of water legs cooperative with a weir box. The weir box is fitted with an adjustable overflow weir cap to control and maintain water in the tank at a desired level. Valving in the water overflow system is operable to regulate the flow of emulsion through the tank.

It is therefore a primary object of the invention to provide an effective and efficient water-oil separation system for breaking an emulsion comprised of liquids of differing densities and specific gravities.

DESCRIPTION OF THE DRAWINGS

The FIGURE illustrates the invention in the form of an upright tank shown in cross-section, to which an overflow system is incorporated, and into which a flow control means is further incorporated.

DESCRIPTION OF THE INVENTION

Referring to FIG. 1, a produced water-oil separation or emulsion receiving tank (10) of the type contemplated is usually a 1000 (BBL high) or a 1500 BBL bolted tank with roof (11), fabricated and constructed in accordance with the specifications of American Petroleum Institute Publication 12B. 1000 BBL and 1500 BBL tanks are 16 and 24 feet high, respectively, and the size of tank utilized depends on the volume of emulsion to be treated. As a safety feature, an overhead vent (12) is provided in the tank to remove gases which rise from the body of the emulsion thus preventing an overpressuring condition.

Means such as a source (15) of an inactive gas is provided for depositing a blanket of said gas into the tank upper end to occupy the void above the emulsion surface (13) and thereby prevent oxygen contamination of the emulsion (and water).

Adjacent to, but spaced downwardly from tank roof (11), an overflow trough (14) is positioned. The trough in one embodiment is comprised of an open topped channel or gutter-like member, which is firmly fixed by bolting or welding to the tank walls through brackets or similar supports. Preferably the trough, fully encircles the tank interior. The overflow trough (14) is designed and adapted to be installed into either a new or in an existing tank such as exemplified by the above mentioned API 1000 BBL or 1500 BBL bolted tanks.

The trough's features facilitate ready conversion of existing in place or surplus tanks to water-oil separation service. Trough (14) further includes a skimming weir (16) which is positioned to normally receive a flow of the crude oil layer (13) or the film which accumulates at the surface of the body of emulsion.

Overflow trough (14) includes a downspout (17) which functions as a drain to keep the trough empty by passing separated crude oil into storage, or into another facility for further processing.

Solid materials which normally fall toward and accumulate at the tank floor (18) in the normal course of emulsion passing from tank inlet (19) to the tank outlet (21) must be removed. As a maintenance practice, the tank is periodically taken out of service and the solid accumulations are manually removed to assure a constant and efficient emulsion flow.

Operationally, emulsion is forced into tank (10) from an external pump (22) having its discharge communicated with tank inlet (19) by a conductor (23). The conductor directs emulsion generally to the tank center where it is further conducted upward through a vertical riser (24). The latter terminates at a discharge port (26) downwardly adjacent to overflow trough (14).

Vertical conductor or riser (24) is supported in place. One such support means is provided in the form of a ladder (27) which extends upwardly from the tank floor (18), to access port (28) at the tank upper end. Such a ladder (27) is normally considered a standard item included with an API bolted type tank.

For effectively regulating liquid flow through tank (10), discharge port or outlet (21) is formed at the tank lower end preferably opposite to inlet (19). Discharge port (21) includes a flange which extends through the tank wall, having a conductor (29) which opens into a first flow control valve (31). An upstanding first leg (32) in the flow and fluid level regulating system is connected to the downstream side of first flow control valve (31).

First leg (32) is communicated at its upper end with a closed weir box (33) positioned generally at an elevation equivalent to the upper end of tank (10). Weir box (33) includes a second or downcomer leg (34) which terminates at or slightly above the tank floor level (18). An auxiliary conductor (36) further directs water from the second leg (34) into a pipeline (37) by way of a second flow regulating valve (38). A third flow control valve (43) is operable to allow direct flow from tank (10) to bypass the liquid lead control weir box (33).

Weir box (33) functions to effectively control the level to which emulsion will build up in tank (10), and is provided with an overflow weir cap (41). The latter is operable to be adjusted longitudinally of downcomer leg (34), having an opening at the upper end which receives overflow water deposited in weir box (33), and allows the water to drain down leg (34) into pipeline (37). By physically regulating or adjusting the elevation of overflow weir (41), the height of emulsion in tank (10) can likewise be regulated, thus avoiding the overflow of water into overflow trough (14).

Operationally, as emulsion is pumped into tank inlet (19), there will be a continuous rising of the lighter, crude oil segment, to the surface (13) of the emulsion. However, as noted, the height of the body of emulsion in tank will be maintained constant as governed by the height of overflow weir (41) in the weir box (33) thereby to stabilize the level of water in tank (10).

It is understood that although modifications and variations of the invention can be made without departing from the spirit and scope thereof, only such limitations should be imposed as are indicated in the appended claims.

We claim:

1. An apparatus for separating components of an emulsion comprised of at least a liquid hydrocarbon component and an aqueous component having a density greater than said hydrocarbon component, said apparatus comprising:

an upright main tank having a cylindrical wall and an integral roof thereon, defining a closed chamber;

inlet means opening into a lower portion of said tank for introducing said emulsion thereto;

an overflow trough fixed in said tank spaced beneath said roof at a constant level;

a skimming weir forming at least a portion of a wall of said overflow trough, said weir being positioned at an elevation to receive hydrocarbon liquid which has risen to the surface of said emulsion;

pipe means depending from said overflow trough for conducting liquid hydrocarbon therefrom to outside said tank;

means to vent gases from said chamber;

means to supply said chamber with inert gas through said means to vent;

discharge means in a lower portion of said tank and spaced from said inlet means for conducting the hydrocarbon-free aqueous component from the tank; and fluid level control means for regulating the flow of emulsion through said tank, said fluid level means having a first leg in communication with said discharge means and extending generally vertically on the outside of said tank, a weir box vertically mounted on and in communication with said first leg having an adjustable weir to receive therein the hydrocarbon free portion of said emulsion from said discharge means, and a downcomer leg connected between said weir box and said discharge means for draining aqueous emulsion therefrom, whereby vertical adjustment of said weir box controls the level of fluid in said tank with respect to said skimming weir.

2. In the apparatus as defined in claim 1 wherein said overflow trough depends from said tank cylindrical wall.

3. In the apparatus as defined in claim 2 wherein said overflow trough defines a continuous channel adjacent to the tank's cylindrical wall.

4. In the apparatus as defined in claim 1 wherein the skimming weir in said overflow trough is positioned at a constant level relative to the surface of said emulsion.

* * * * *